Patented July 11, 1939

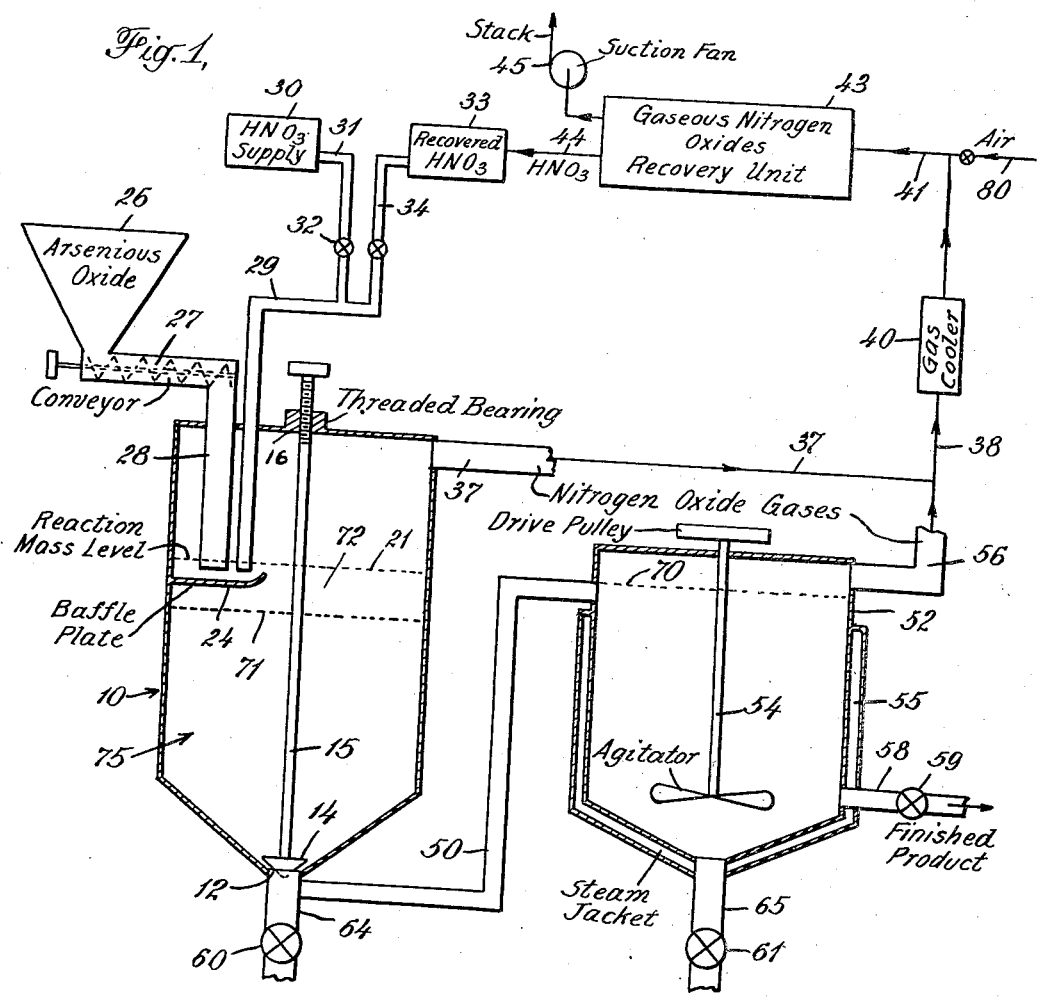

2,165,944

UNITED STATES PATENT OFFICE 2,165,944

MANUFACTURE OF ARSENIC ACID

Garnett L. Scott, Wilmington, Del., assignor to General Chemical Company, New York, N. Y., a corporation of New York Application May 22, 1937, Serial No. 144,249

5 Claims. (Cl. 23—144)

This invention relates to manufacture of arsenic acid.

In the usual commercial methods for making arsenic acid, arsenious oxide and nitric acid are fed separately or simultaneously into a relatively large reaction vat or chamber until a sufficient quantity of raw materials has been introduced into the reaction chamber to make up the charge. The reaction mass is agitated during addition of the raw materials and also throughout the relatively long subsequent interval during which reaction of acid and oxide is completed. The time required to complete reaction of a batch may vary from say 16 to 72 hours depending upon the size of the reaction chamber. At the end of reaction, the mass is balanced with acid or oxide as required, and the arsenic acid product withdrawn. In the course of the reaction, gaseous oxides of nitrogen are evolved, withdrawn from the reaction chamber and introduced into an absorption system in which the nitrogen oxides are recovered as nitric acid. Such nitric acid, together with a fresh supply to make up for the amount of acid lost, is utilized in production of a further quantity of arsenic acid. The procedure is a batch operation.

Commercial manufacture of arsenic acid involves many practical operating difficulties. In batch operation, the principal difficulties encountered arise out of slowness and irregularity of the nitric acid-arsenious oxide reaction. When proceeding batchwise, at the beginning of operations reaction takes places with great rapidity and intensity and large volumes of gaseous oxides of nitrogen are evolved often with almost explosive violence. Generation of large quantities of gas gives rise to excessive foaming which may require temporary cessation of introduction of the raw materials into the reaction kettle for a time interval long enough to permit the foaming to subside or necessitate use of some complicated procedure, such as spraying the surface of the reaction mass with reaction liquor, to break down the foam and effect liberation of the bubble forming gases.

One of the major considerations in the manufacture of arsenic acid is the recovery as nitric acid of the gaseous oxides of nitrogen. While at the beginning of the reaction, large volumes of gaseous oxides of nitrogen are given off, as the reaction progresses reaction velocity drops off rapidly and during the major portion of the later phases of the reaction only small quantities of gaseous oxides of nitrogen are formed. For any given reaction chamber unit, the recovery system must be designed large enough to recover the gaseous oxides of nitrogen at the time the maximum volume of gas is being given off. As indicated, in commercial operations, time intervals ranging from say 16 to 72 hours are often required to complete a batch reaction. Since evolution of gaseous oxides of nitrogen is at a maximum during only the initial few hours of the total time necessary to react the nitric acid and the arsenious oxide, it will be seen that during the greater part of a batch cycle, with respect to the quantity of nitrogen oxide gases handled, the recovery system is working at much less than the designed capacity.

It will be understood that since recovery of nitrogen oxides as nitric acid includes oxidation of lower oxides evolved in the nitric acid-arsenious oxide reaction, air must be admixed with the nitrogen oxide gases. This is usually done by means of an air inlet in the nitrogen oxide gas main just ahead of the recovery towers. In commercial practice, flow of gas through the recovery unit is effected by a suction fan the inlet side of which is connected to the gas outlet of the last tower of the series. Such fan is designed to operate at constant speed and consequently at all times draws a substantially constant volume of gas through the towers. In the prior procedure, as the quantity of nitrogen oxide gases evolved in the nitric acid-arsenious oxide reaction zone drops off (almost to zero at the end of the reaction) a correspondingly greater amount of air is drawn into the recovery unit through the air inlet. Alternatively, when excessively large volumes of nitrogen oxide gases are generated in the nitric acid-arsenious oxide reaction zone, the quantity of air drawn into the system through the inlet is correspondingly decreased. The result is a more or less continuous fluctuation of the composition of the gas mixture entering the recovery unit. Accordingly, it will be seen the constantly varying changes in volume of nitrogen oxide gases as such fed to the recovery unit and variations in composition of the gas mixture entering the recovery system prevent efficient operation of the recovery system to such an extent that substantial amounts of nitrogen oxides escape with the tail gases of the last absorption tower thus resulting in substantial losses of nitric acid. Another objection to batch operation is that at the beginning of the reaction heat is generated more rapidly than required to offset radiation losses and maintain desirable reaction temperature, and consequently the rate of addition of reactants must be slowed down or the batch chilled by addition of cold water. In the later phases not enough heat is evolved. As the reaction proceeds so little heat is generated that the temperature may fall and seriously reduce the rate of reaction, thus requiring provision of means for heating the reaction and consumption of heat for this purpose.

The principal object of the invention is to provide a process for the manufacture of arsenic acid by an operation in which evolution of nitrogen oxide gases is smooth and uniform, and by which the recovery system may be operated constantly at maximum capacity. By eliminating pulsations in volume of nitrogen oxide gases as such conducted to the recovery system and variations in composition of the nitrogen oxide-air gas mixture fed into the recovery system, the recovery system may be kept operating continuously at maximum efficiency with one important result that loss of nitric acid is decreased, thus accomplishing another object of the invention, namely, reduction of the amount of nitric acid consumed per unit of arsenic acid produced. Another object of the invention is to provide a process by which production of arsenic acid of a given reaction chamber unit may be substantially increased as compared with the arsenic acid output of the same unit when operated according to prior practice. For example, when practicing the process of the invention and using a recovery system and a reaction chamber unit of the same size as employed in prior practice where the nitric acid-arsenious oxide reaction is carried out batchwise, less nitric acid is consumed and arsenic acid production may be increased as much as 50%.

The objects, advantages and details of operation of the process of the invention may be more clearly understood from a consideration of the following description taken in connection with the accompanying drawing, in which Fig. 1 illustrates, partly diagrammatic and partly in section, apparatus which may be employed in carrying out the improved process, and Fig. 2 illustrates a fragmental section of a modified reaction chamber.

Referring to Fig. 1, 10 indicates a closed reaction chamber or vat provided at the bottom with a discharge opening 12. Flow of liquid through opening 12 may be controlled by a valve 14 attached to the lower end of a vertically movable shaft 15 rotatably supported in threaded bearing 16.

Dotted line 21 may be considered as indicating the normal level of the reaction mass in chamber 10. Projecting from the inner wall of the reaction chamber is a plate-like shelf or baffle 24. As shown on the drawing, this plate is positioned so that during progress of the reaction, the plate is submerged slightly beneath the surface of the reacting mass. A supply of arsenious oxide is maintained in a bin 26 and fed by screw conveyor 27 into the upper end of feed pipe 28, the lower end of which is positioned a short distance above the upper surface of plate 24.

Fresh nitric acid is introduced into the reaction chamber from a tank 30 through pipe 29 and pipe 31 having a control valve 32. Nitric acid formed in the gaseous oxides of nitrogen recovery system may be run from storage tank 33 through pipe 34 and pipe 29 into the reaction chamber. The lower end of pipe 29 terminates a short distance above the surface of shelf 24. The purpose of the arrangement of shelf 24, pipe 29 and arsenious oxide feed pipe 28 is to permit introduction of nitric acid and arsenious oxide into the reaction mass in a way such as to avoid splashing or any substantial agitation in the reaction mass. The gaseous oxides of nitrogen evolved in chamber 10 during the reaction discharge into pipe 37, flow thence through mixing conduit 38, gas cooler 40, and mixing conduit 41 into the recovery system indicated by reference numeral 43. It will be understood the gaseous oxides of nitrogen recovery system is of standard construction and includes a plurality of absorption towers connected in series and operated so as to absorb gaseous oxides of nitrogen and form nitric acid which is discharged through pipe 44 into storage tank 33. Flow of a constant volume of gas through the recovery unit is maintained by a fan 45, the suction side of which is connected to the gas outlet of the last tower of the recovery unit.

During normal operation when valve 14 is opened liquor flows out of the bottom of chamber 10, through pipe 50 into the upper end of a second reaction chamber 52, preferably equipped with a suitable agitator 54 and a steam jacket 55. If desired, provision may be made for use of air as an agitating agent in chamber 52. Gaseous oxides of nitrogen evolved in chamber 52 flow through outlet pipe 56, mixing conduit 38, gas cooler 40, and mixing conduit 41 into recovery system 43. Finished product is continually withdrawn from chamber 52 through pipe 58 having a control valve 59. From time to time, valves 60 and 61 in the bottom of reaction chambers 10 and 52 respectively may be opened momentarily to withdraw any sediment collecting in traps 64 and 65.

The improved process may be practiced as follows:

To start operation, valve 59 in reaction chamber 52 discharge pipe 58 may be closed and the system filled with arsenic acid, of a previous operation, in quantity sufficient to raise the liquor mass in the system to approximately the levels of dotted line 21 in chamber 10 and dotted line 70 in chamber 52. The concentration of the fresh nitric acid in tank 30 may be about 40–42° Bé. A supply of arsenious oxide, for example crude dust chamber arsenious oxide, may be maintained in bin 26 by apparatus not shown. Valve 32 in nitric acid supply pipe 31 is adjusted and the rate of rotation of screw conveyor 27 is controlled so as to introduce into reaction chamber 10 substantially reacting quantities of arsenious oxide and nitric acid. The oxide fed in through pipe 28 and the acid introduced through pipe 29 impinge on the surface of shelf 24 and are thus introduced quiescently into the fluid body in the reaction chamber. Since, as will subsequently more fully appear, the nitric acid is lighter than the liquor mass in the reaction chamber, the acid tends to float on the surface of the mass. On introduction of acid and oxide, reaction takes place, gaseous oxides of nitrogen are evolved and flow through pipes 37, 38, cooler 40, and mixing conduit 41 into the recovery system 43. For most efficient nitrogen oxide recovery, the amount of water introduced into the last tower of the recovery system is preferably such that the concentration of the nitric acid formed and flowed into tank 33 is of concentration of about 28–30° Bé. Since in the present process, recovery of oxides of nitrogen may be as high as 90% and upwards, only a relatively small amount of fresh nitric acid from tank 30 need be used. After operations are under way, the average concentration of the nitric acid introduced into the reaction chamber through pipe 29 may be around say 32–34° Bé.

While at the beginning, the liquor in chamber 10 may be arsenic acid of a previous process, after operations have been started and are proceeding normally, the relatively liquid body 75 in chamber 10, in the secondary reaction sphere say beneath the level indicated by the dotted line 71, comprises at least partially reacted nitric acid and arsenious oxide (arsenic acid). In the preferred mode of operation, however, liquid body 75 comprises material in which the reaction has proceeded say upwards of 80% of completion, and the expression "substantially reacted nitric acid and arsenious oxide" is intended to designate relatively liquid material which has reacted about 80% or more to completion. As will presently appear, the concentration of liquid body 75 is maintained not less than about 65° Bé. and preferably not less than about 70° Bé.

Introduction of arsenious oxide from bin 26 and nitric acid from tanks 30 and 33 in reacting proportions is continued. Since the density of the nitric acid is substantially less than that of fluid body 75, the nitric acid tends to float and the preliminary and probably major portion of the reaction of nitric acid and arsenious oxide is effected as a relatively flash reaction taking place substantially on the surface portion of the fluid body 75, in a zone or sphere conveniently designated a primary reaction sphere 72 which for illustrative purposes may be considered as lying above line 71 and occupying the upper few inches of the entire reaction mass. The reaction products formed, consisting of constituents going to make up fluid body 75, sink away from the surface of the liquor mass with the result that the reaction products though formed initially in the surface reaction sphere 72 are promptly and continuously removed from the zone of most intense reaction. Quiescent introduction of arsenious oxide and nitric acid, the absence of any substantial agitation, continual settling of reaction products out of the surface reaction sphere, and quiescent conditions existing in the reaction mass as a whole all contribute to effecting reaction of nitric acid and arsenious oxide while the acid is at its strongest concentration. Hence, the relatively pure reactants are contacted without undue local dilution by products of reaction. This procedure speeds up the reaction, keeps the reaction rate at a maximum, and eliminates excessive and irregular foaming on the surface of the reaction mass. Furthermore, such procedure makes agitation unnecessary and in this respect results in a saving of power and permits use of simpler apparatus.

Since the more violent preliminary phases of the reaction take place in surface reaction sphere 72 on top of the fluid mass 75, the nitrogen oxide gases formed are readily liberated and since gas evolution takes place mostly at or near the surface of the mass bubble formation and resultant foaming are minimized. The nitrogen oxide gases are generated in approximately constant volume and pass at temperatures of about 220° F. through outlet pipe 37 and mixing conduit 38 into gas cooler 40.

The amount of water introduced into reaction chamber 10, controlled by regulating the amount of water used in the recovery system 43, is such that the concentration of the mass of substantially reacted nitric acid and arsenious oxide constituting the fluid body 75 is not less than about 65° Bé. In usual operations carried on at the acid concentrations mentioned, the concentration of fluid body 75 should be and is preferably not less than about 70° Bé. This feature of operation is important in two respects. Where the concentration of the fluid body 75 is not less than about 65° Bé., the volume of ingredients in chamber 10 is small enough so that the entire mass may be constantly maintained at reaction temperature, e. g., 210° F., by the heat generated by the reaction, thus making the entire reaction in chamber 10 exothermic and self-sustaining. Thus, the process of the invention is such as to effect continual liberation of constant quantities of heat, in this way avoiding the necessity of employing steam jacketed equipment for the main reaction chamber 10 and consequent consumption of extraneous heat as in prior methods. Secondly, by maintaining the concentration of the fluid body 75 at 65° Bé. or over the difference in concentration between fluid body 75 and the acid fed into the system through pipes 31 and 36 is sufficient so as to cause the nitric acid to float on top of the mass and to prevent substantial or rapid diffusion of the fresh incoming nitric acid into fluid body 75, thus avoiding dilution of the acid by reaction products and slowing up of the principal reaction in surface zone 72. Accordingly, while proceeding so as to maintain the concentration noted in body 75, no extraneous heating is necessary and the maintenance of the primary reaction between nitric acid and arsenious oxide substantially on the surface of body 75 is promoted.

On account of increase of specific gravity and constant withdrawal of liquor through discharge opening 12, the reaction products formed in the upper primary reaction sphere 72 gradually sink toward the bottom of the chamber 10. During this time interval, reaction of incompletely reacted arsenious oxide and nitric acid progresses although at a rate much less than the rapidity of the substantially flash reaction taking place in sphere 72. In the preferred procedure, introduction of the raw materials to and withdrawal of liquor from chamber 10 are both regulated so that the nitric acid-arsenious oxide reaction is upwards of say 80% complete by the time a given quantity of liquid is discharged from chamber 10 through outlet 12. Under usual optimum conditions, reaction is generally about 85–90% finished in chamber 10. In the manufacture of a given quantity of arsenic acid, about the same time interval is required to effect completion of the last 20 to 10% of the reaction as is needed to carry out the initial 80 to 90% of complete reaction. Hence, operations are conducted so that by the time reaction in chamber 10 progresses to about 80 to 90% completion, the liquor is run by gravity continuously through pipe 50 into the second reaction chamber 52 which may be of size sufficient to hold a volume of liquor equal to that in chamber 10. In chamber 52, reaction of incompletely reacted acid and oxide progresses normally at constantly decreasing rate. To hasten completion of reaction, the liquor in chamber 52 may be constantly agitated and sufficient extraneous heat may be supplied by means of steam jacket 55 to maintain the liquor in chamber 52 at temperatures of more than about 190° F. In chamber 52, further quantities of gaseous oxides of nitrogen are liberated and flow through pipe 56 and mixing conduit 38 into gas cooler 40. Although the volume of gases generated in chamber 52 is substantially less than the volume of gases generated in chamber 10, and the gases of chamber 52 may be slightly lower in oxides of nitrogen and slightly higher in water vapor, the rate of generation of the gases in chamber 52 is relatively constant so that, after mixing of such gases from pipe 56 with the gases from pipe 37 in mixing conduit 38, the volume and composition of the gas introduced into the gas coooler 40 from pipe 38 is substantially the same throughout operation of the process. The gases fed into the gas cooler are understood to consist of nitric oxide, nitrous anhydride, nitrogen tetroxide, and water vapor, and in the present process the composition of the gas rarely varies to any appreciable extent. In cooler 40, the gases are cooled to about 120° F. to hasten oxidation in recovery unit 43.

It will be understood that since recovery as nitric acid requires oxidation of the lower oxides evolved in the nitric acid-arsenious oxide reaction, air must be admixed with the nitrogen oxide gases at some point prior to introduction of such gases into the oxidation towers. It should be appreciated the quantity of air needed should be in direct proportion to quantity of nitrogen oxides, so as to avoid either deficiency of oxygen on the one hand or excessive dilution on the other, either of which will result in inefficient operation of recovery system both with respect to capacity of nitrogen oxide gases as such handled, and loss of nitrogen oxides. Air is drawn into the system through an inlet 80. As indicated previously, fan 45 draws a given constant volume of gas through the recovery unit. If only a deficiency of nitrogen oxide gas from cooler 40 is available a correspondingly greater amount (an excess) of air will be drawn in through inlet 80. Vice versa, if an excess of nitrogen oxide gases from cooler 40 is available, a correspondingly smaller amount (a deficiency) of air will be drawn in through inlet 80. In either situation, the composition of gas fed into recovery unit 43 from mixing pipe 41 is out of balance and efficiency of the recovery unit drops off. Maintenance of the proper ratio of nitrogen oxide gases and air in the recovery system is impossible where, as in the prior practice, the volume of nitrogen oxides leaving cooler 40 is constantly fluctuating. On the other hand, in the present process, evolution of nitrogen oxides is substantially uniform with the result that nitrogen oxide gas of constant volume and composition is discharged from cooler 40. Consequently, the proper ratio of nitrogen oxides and air in pipe 41 can be set with accuracy and maintained. Accordingly, the process provides means by which there may be supplied to recovery unit 43 a nitrogen oxide-air mixture of constant volume and composition, and the recovery system may be continuously operated at maximum efficiency, thus avoiding the previously described operating difficulties arising from pulsations in volume of nitrogen oxide gas flow to and variations in gas composition entering the recovery system.

Should it be desirable to use air in chamber 52 as an agitating agent, it will be understood such air takes the place of some of the air which would otherwise be introduced through inlet 80. If air were used in chamber 52, since the amount of air used for agitating purposes would be constant and the quantity of nitrogen oxide gases generated in chamber 52 would also be constant, the volume and composition of the gas mixture discharged from cooler 40 would also be constant. While under optimum operating conditions there is but little variation in the volume of the nitrogen oxide gas discharged from cooler 40 (and in the volume of nitrogen oxide gas as such fed into the recovery system), a plus or minus variation of 10-12% is permissible without foregoing any of the practical advantages of the process. In the present application the expression "substantially constant volume" is to be understood as including such variation.

In chamber 52, reaction of incompletely reacted arsenious oxide and nitric acid proceeds to completion, and finished product may be continuously withdrawn through pipe 58. With reasonably accurate control of the arsenious oxide and nitric acid feeds to chamber 10, no balancing (i. e., further addition of relatively small amounts of oxide or acid) is necessary in chamber 52. Such a relatively large volume of liquor is at all times present in the system, that should feed of acid or oxide to chamber 10 be temporarily irregular, such irregularity becomes absorbed in the large volume of liquid in the apparatus.

Any reaction irregularities taking place in the system may be noted quickly by rapid temperature changes in the gas discharged from chamber 10 through pipe 37. Under average operating conditions, the gas temperature in pipe 37 just at the point of exit from chamber 10 is normally about 220° F. plus or minus a few degrees. Such temperature is notably sensitive to reaction changes in chamber 10, and hence for example any feed irregularities of acid or oxide may be noted by an almost immediate appreciable drop of gas temperature in pipe 37. Thus, control of operation is relatively simple.

Fig. 2 of the drawing illustrates a modified reaction chamber 81 which is constructed the same as chamber 10 except distributing plates 82 are used in place of shelf 24. Plates 82 lie within a zone or reaction sphere 84 comparable with sphere 72 of chamber 10. Operations are carried out in chamber 81 in the same way as in chamber 10, plates 82 of chamber 80 being in effect a more efficient substitute for shelf 24 of chamber 10. Plates 82 provide more extensive surface where intense reaction takes place and oxides of nitrogen are liberated without agitation of the bulk of the reaction mass.

As previously indicated the process of the invention is such as to effect increase of the overall recovery of gaseous oxides of nitrogen and increase of the quantity of arsenic acid produced in a reaction chamber of given size. In the present process, nitrogen oxide gas supply to the recovery system is constant with respect to both volume and composition. When these conditions prevail it is possible to operate a given absorption system constantly at maximum efficiency with the result that the amount of nitrogen oxide gases recovered as nitric acid, per unit of arsenic acid produced, may be increased from about 83-84% to about 90-92%.

In the prior procedure, a given quantity of arsenious oxide and nitric acid was charged into a reaction chamber of given size, and as explained previously it was necessary to design the nitrogen oxide gas recovery unit big enough to handle the maximum volume of nitrogen oxide gases generated, even though during the major portion of the nitric acid-arsenious oxide reaction the amount of gases generated was far below maximum. In the present method, the recovery system is designed to handle a maximum given volume of nitrogen oxide gas as such, but on account of the improved procedure involved in feeding the raw oxide and acid into the reaction chamber, introduction of raw ingredients may be increased and contantly kept at a point where nitrogen oxide gas generation is at the maximum for which the recovery plant is designed. Hence, greater quantities of raw acid and oxide may be fed into a given reaction chamber in a given unit of time with the result that arsenic acid production may be substantially increased. Experience shows that practice of the present process permits increase of arsenic acid production as much as 50% in excess of that obtained in the same size apparatus but operated in accordance with the prior procedure.

I claim:

1. The method for making arsenic acid which comprises maintaining in a reaction zone, heated to reaction temperatures, a relatively quiescent liquid body comprising at least partially reacted nitric acid and arsenious oxide, continuously and quiescently feeding, in the absence of substantial agitation, to the surface portion of said body arsenious oxide and at least reacting proportions of nitric acid of density less than that of said body, effecting contact of reactant nitric acid and arsenious oxide without substantial dilution of nitric acid by reaction products and without substantial diffusion of fresh incoming nitric acid into said body, continuously withdrawing nitrogen oxide gas from said reaction zone, continuously withdrawing from said reaction zone a portion of said liquid body, regulating introduction of nitric acid and arsenious oxide into and withdrawal of liquid body from said zone so as to effect therein reaction of arsenious oxide to not less than about 80% of completion and so as to maintain the concentration of said liquid body not less than about 65° Bé., introducing said portion into a second reaction zone, heated to reaction temperatures, and therein effecting further reaction of nitric acid and arsenious oxide.

2. The method for making arsenic acid which comprises maintaining in a reaction zone, heated to reaction temperatures, a relatively quiescent liquid body comprising at least partially reacted nitric acid and arsenious oxide, continuously and quiescently feeding, in the absence of substantial agitation, to the surface portion of said body arsenious oxide and at least reacting proportions of nitric acid of density less than that of said body, effecting contact of reactant nitric acid and arsenious oxide without substantial dilution of nitric acid by reaction products and without substantial diffusion of fresh incoming nitric acid into said body, continuously withdrawing nitrogen oxide gas from said reaction zone, continuously flowing a portion of said liquid body into a second reaction zone, heated to reaction temperatures, and therein effecting completion of nitric acid-arsenious oxide reaction, regulating introduction of nitric acid and arsenious oxide into said first zone and regulating withdrawal of liquid body from said second zone so as to effect in the first zone reaction of arsenious oxide to not less than about 80% of completion and so as to maintain the concentration of said liquid body in the first zone not less than about 65° Bé., and to substantially complete reaction of nitric acid and arsenious oxide in the second zone.

3. The method for making arsenic acid which comprises maintaining in a reaction zone, heated to reaction temperatures, a relatively quiescent liquid body comprising at least partially reacted arsenious oxide and nitric acid, continuously and quiescently feeding, in the absence of substantial agitation, to the surface portion of said body substantially reacting proportions of arsenious oxide and nitric acid of density less than that of said body, effecting contact of reactant nitric acid and arsenious oxide without substantial dilution of nitric acid by reaction products and without substantial diffusion of fresh incoming nitric acid into said body, continuously withdrawing nitrogen oxide gas from said reaction zone, continuously withdrawing from said reaction zone a portion of said liquid body, regulating introduction of nitric acid and arsenious oxide into and withdrawal of liquid body from said zone so as to effect therein reaction of arsenious oxide and nitric acid to not less than about 80% of completion and so as to maintain the concentration of said liquid body not less than about 65° Bé., introducing said portion into a second reaction zone, heated to reaction temperatures, and therein effecting further reaction of nitric acid and arsenious oxide.

4. The method for making arsenic acid which comprises maintaining in a reaction zone, heated to reaction temperatures, a relatively quiescent liquid body comprising at least partially reacted arsenious oxide and nitric acid, continuously and quiescently feeding, in the absence of substantial agitation, to the surface portion of said body substantially reacting proportions of arsenious oxide and nitric acid of density less than that of said body, effecting contact of reactant nitric acid and arsenious oxide without substantial dilution of nitric acid by reaction products and without substantial diffusion of fresh incoming nitric acid into said body, continuously withdrawing nitrogen oxide gas from said reaction zone, continuously flowing a portion of said liquid body into a second reaction zone, heated to reaction temperature, and therein effecting completion of nitric acid-arsenious oxide reaction, regulating introduction of nitric acid and arsenious oxide into said first zone and regulating withdrawal of liquid body from said second zone so as to effect in the first zone reaction of arsenious oxide and nitric acid to not less than about 80% of completion and so as to maintain the concentration of said liquid body in the first zone not less than about 65° Bé., and to substantially complete reaction of nitric acid and arsenious oxide in the second zone.

5. The method for making arsenic acid which comprises maintaining in a reaction zone, heated to reaction temperatures, a relatively quiescent liquid body comprising at least partially reacted nitric acid and arsenious oxide, continuously and quiescently feeding, in the absence of substantial agitation, to the surface portion of said body arsenious oxide and at least reacting proportions of nitric acid of density less than that of said body, effecting contact of reactant nitric acid and arsenious oxide without substantial dilution of nitric acid by reaction products and without substantial diffusion of fresh incoming nitric acid into said body, continuously withdrawing nitrogen oxide gas from said reaction zone, continuously withdrawing from said reaction zone a portion of said liquid body, regulating introduction of nitric acid and arsenious oxide into and withdrawal of liquid body from said zone so as to effect therein reaction of at least the major portions of nitric acid and arsenious oxide and so as to maintain the concentration of said liquid body not less than about 65° Bé., introducing said portion into a second reaction zone, heated to reaction temperatures, and therein effecting further reaction of nitric acid and arsenious oxide.

GARNETT L. SCOTT.